United States Patent
Hata

(10) Patent No.: US 7,492,330 B2
(45) Date of Patent: Feb. 17, 2009

(54) CAP WITH DISPLAY DEVICE

(76) Inventor: Yoshiaki Hata, 18-18-410, Nangu-cho, Ashiya-Shi, Hyogo, 659-0024 (JP)

( * ) Notice: Subject to any disclaimer, the term of this patent is extended or adjusted under 35 U.S.C. 154(b) by 495 days.

(21) Appl. No.: 10/946,576

(22) Filed: Sep. 20, 2004

(65) Prior Publication Data

US 2005/0057439 A1      Mar. 17, 2005

Related U.S. Application Data

(63) Continuation-in-part of application No. PCT/JP03/03562, filed on Mar. 24, 2003.

(30) Foreign Application Priority Data

Mar. 21, 2002   (JP) .............................. 2002-125014

(51) Int. Cl.
*G09G 5/00*  (2006.01)
(52) U.S. Cl. .................. 345/7; 345/8; 345/9; 359/630; 359/631; 359/632; 349/11
(58) Field of Classification Search ..................... 345/7, 345/8, 9
See application file for complete search history.

(56) References Cited

U.S. PATENT DOCUMENTS 5,583,335 A * 12/1996 Spitzer et al. ............... 250/221
5,726,807 A * 3/1998 Nakaoka et al. ............. 359/631
5,739,797 A    4/1998 Karasawa et al.
5,754,344 A * 5/1998 Fujiyama ..................... 359/631
5,790,311 A * 8/1998 Togino ........................ 359/630
6,167,413 A * 12/2000 Daley, III .................... 708/139
6,493,146 B2 * 12/2002 Inoguchi et al. ............. 359/630

FOREIGN PATENT DOCUMENTS

| JP | 1-295577 A1 | 11/1989 |
| JP | 7-140432 A1 | 6/1995 |
| JP | 11-136704 A1 | 5/1999 |
| JP | 2002-72130 A1 | 3/2002 |

* cited by examiner

*Primary Examiner*—Richard Hjerpe
*Assistant Examiner*—Jennifer T Nguyen
(74) *Attorney, Agent, or Firm*—Darby & Darby

(57) ABSTRACT

A cap with a display device includes a display element suspended in a position below a visor of the cap and in front of the forehead of a wearer and above the eyes of the wearer so as to allow a display surface of the display element to be directed ahead of the wearer, and a concave mirror suspended in a position below the visor and ahead of the display element from the wearer so as to allow a reflective surface of the concave mirror to be directed to the eyes of the wearer. The cap with a display device enables the wearer to observe an enlarged virtual image derived from an image displayed on the display element.

32 Claims, 6 Drawing Sheets

CAP WITH DISPLAY DEVICE

CROSS-REFERENCE TO PRIOR APPLICATION

This is a continuation in part application of International Patent Application No. PCT/JP03/03562 filed Mar. 24, 2003, and claims benefit of Japanese Patent Application No. 2002-125014, filed Mar. 21, 2002 which is incorporated by reference herein. The International Application was published in Japanese on Oct. 2, 2003 as WO 03/081319 A1 under PCT Article 21(2).

BACKGROUND OF THE INVENTION

1. Field of the Invention

The present invention relates to a cap having a function for enabling a wearer to see or hear various information including images, characters, voices, and the like.

2. Description of the Related Art

A typical cap with a display function is configured to arrange a number-display element that functions as a clock in a visor at an oblique or approximately horizontal angle, and to form a virtual image of the display element by use of a concave mirror arranged to cover the eyes of a wearer, thereby allowing the wearer to see the virtual image.

A typical head mount display is configured to arrange a prism block including a concave mirror in front of the eyes of a wearer, and to form an enlarged virtual image that is derived from a display element positioned beside the prism block by use of the concave mirror, thereby allowing the wearer to see the virtual image (See for example, U.S. Pat. No. 5,739,797).

In the prior cap with a display function described above, light from the display element enters the concave mirror at a shallow angle. Accordingly, a planar shape of the concave mirror is formed into an aspheric shape, a nonaxisymmetric shape or the like for aberration correction, thereby optimizing the display image. However, it is difficult to achieve fine aberration correction throughout a wide field of view and to realize image display at high resolution and with a wide view angle.

Similarly, in the above-described prior head mount display, light from the display element enters the concave mirror at a shallow angle. Correspondingly, an incident surface of the prism block for the light from the display element is formed into an aspheric shape, and the concave mirror is formed into a nonaxisymmetric shape to achieve fine aberration correction throughout a wide field of view. Accordingly, such a device is heavy and expensive to manufacture. This device also has a disadvantage in that an image is apt to partly vanish as a result of eye movement.

Meanwhile, when the concave mirror in any of the foregoing configurations includes a translucent mirror, the concave mirror creates a distorted outside view. Accordingly, the wearer cannot observe a clear view when superimposing the display image on the outside view.

SUMMARY OF THE INVENTION

According to an aspect of the present invention, a cap with a display device includes a display element suspended in a position below a visor of the cap, in front of the forehead of a wearer, and above the eyes of the wearer so as to allow a display surface of the display element to be directed ahead of the wearer, and a concave mirror suspended in a position below the visor and ahead of the display element from the wearer so as to allow a reflective surface of the concave mirror to be directed to the eyes of the wearer, whereby the cap with a display device enables the wearer to observe an enlarged virtual image derived from an image displayed on the small display element.

BRIEF DESCRIPTION OF THE DRAWINGS

The foregoing and other features o the present invention will be more readily apparent from the following detailed description and drawings of an illustrative embodiment of the invention in which.

DETAILED DESCRIPTION OF THE PREFERRED EMBODIMENTS

According to one embodiment of the present invention there is provided a cap with a display device to be placed on the head of a user, in which a small display element such as a liquid crystal display, and a concave mirror for enlarging an image displayed on the small display element, are suspended below a visor protruding forward from the forehead of a wearer. The small display element is suspended below the visor in a position close to the forehead of the wearer so as to allow a display surface of the display element to be directed ahead of the wearer.

This small display element is suspended below the visor in a position above the eyes of the wearer so as not to block the vision of the wearer. As the small display element only needs to be positioned so as not to block the vision of the wearer, the small display element may be positioned vertically in a range from the forehead to just above the eyelids of the wearer. Within this range, it is possible for the small display element to be relatively large, which is advantageous in a case where a high resolution display element is to be used for supporting a Video Graphics Array (VGA) class or higher resolution.

The concave mirror for enlarging the image displayed on the small display element is suspended below the visor and ahead of the small display element from the wearer so as to allow a reflective surface of the concave mirror to be directed to the eyes of the wearer. The concave mirror forms an enlarged virtual image derived from the image displayed on the small display element. The wearer can utilize a high resolution and high quality image by observing the enlarged virtual image formed by the concave mirror. Since the visor blocks the entry of surrounding light, the present invention also has an advantage in that it facilitates observation of the displayed image.

Figure 6:
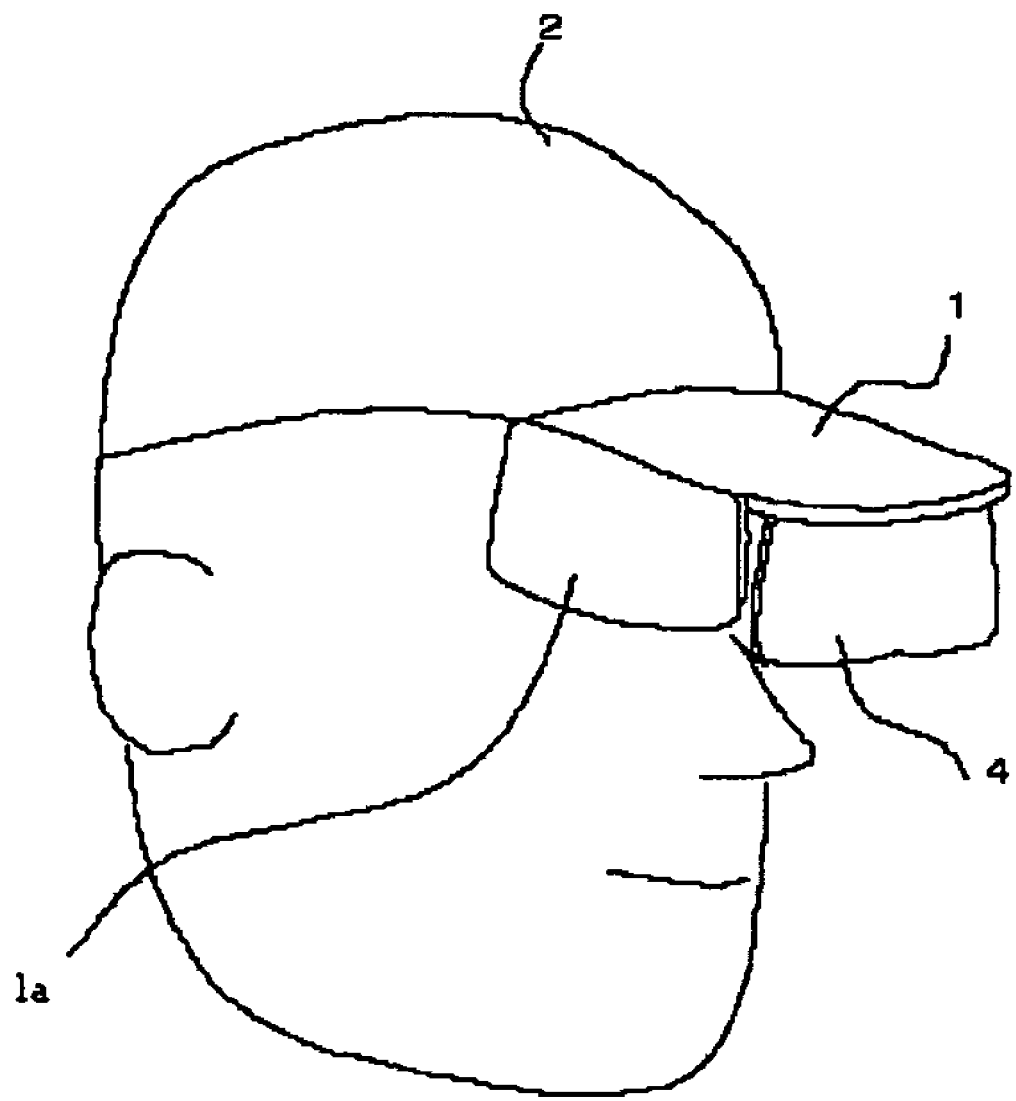
FIG. 6 is a view showing a user wearing a display device with light shielding plates at both side edges of the visor

It is also possible to provide the concave mirror with a sunglasses function by use of a translucent mirror. In this case, only the concave mirror may be suspended below the visor while folding back the small display element along the visor, or the small display element may be set to a non-display state, or an illumination device for the small display element may be turned off. As shown in FIG. 6, by providing light shielding plates 1a beside the visor so as to block the light entering from the sides, it is possible to improve the visibility of the displayed image and to improve the effect of the display device as sunglasses.

Figure 1:
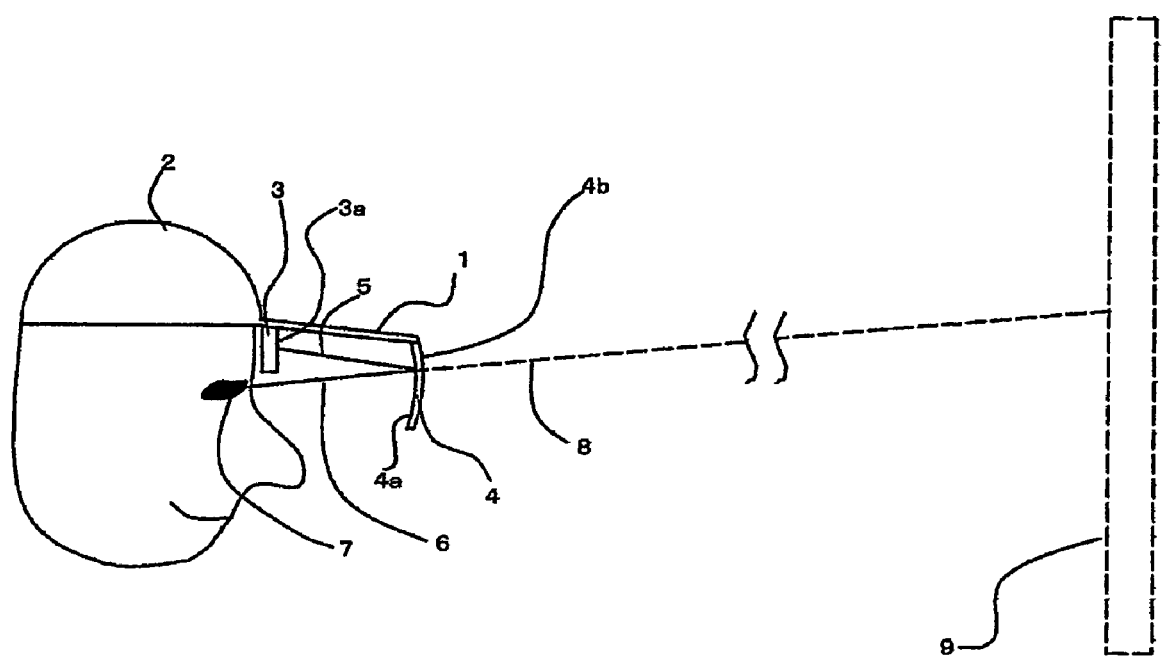
FIG. 1 is a side view showing a user wearing a display device according to the present invention.

Now, the configuration of the present invention will be described with reference to the accompanying drawings. FIG. 1 is a side view showing a user wearing a display device of the present invention. In FIG. 1, the reference numeral 1 denotes a visor protruding forward from the forehead of a wearer, and the reference numeral 2 denotes a main unit of a cap for fixing the visor onto the head of the wearer. A small display element 3 and a concave mirror 4 are fitted below the visor.

A display surface 3a of the small display element 3 is directed ahead of the wearer. An image displayed on the display surface 3a is formed into an enlarged virtual image on a reflective surface 4a of the concave mirror 4, which is disposed ahead of the small display element 3 from the wearer. Hence the wearer can observe the enlarged virtual image. In this cap with display device, the display surface 3a of the display element 3 and the visor 1 preferably form an angle of 90 degrees±10 degrees. On the other hand, when assuming a plane perpendicular to the optical axis of the reflective surface 4a of the concave mirror 4, the plane and the visor 1 preferably form an angle of 90 degrees±10 degrees. These positional relationships between the display element 3 and the visor 1, and between the concave mirror 4 and the visor 1, can suppress possible aberration over a wide view angle, thereby producing a high quality image with a wide view angle.

The small display element 3 may include a transmissive liquid crystal display, and a surface light source attached to a rear surface of the transmissive liquid crystal display. In this case, light intensity of the surface light source may be rendered adjustable.

The reflective surface 4a and the other surface 4b of the concave mirror 4 may be formed into substantially the same shape (in other words, the thickness of a cross section perpendicular to the surfaces of the concave mirror 4 may be formed so as to be entirely uniform). In this way, the wearer can see an outside view, i.e., a view beyond the mirror, without distortion when the reflective surface 4a includes a translucent mirror. Alternatively, the surface 4b may be formed into the reflective surface instead of the surface 4a.

The reference numeral 5 denotes a light path extending from the small display element. A ray traveling on the light path 5 is reflected by the concave mirror 4 and travels on a light path 6, thereby reaching the eyes 7 of the wearer of the display device. The wearer of the display device observes the ray passing along the light path 6 as a virtual image 9 derived from the small display element as if the virtual image 9 passed along a light path 8 deemed an extension of the light path 6 beyond the concave mirror. Since the reflective surface is concave, the virtual image thus formed is observable as an enlarged image located in a more remote position than the actual distance between the concave mirror and the small display element.

For example, when the distance from the display element to the concave mirror is set to 24.5 mm and the curvature radius of the concave mirror is set to 50 mm, the virtual image observed by the wearer is formed at 1225 mm ahead of the concave mirror and at 50-fold magnification. As is apparent from these values, in the present invention, it is possible to incorporate the display element in a normal sized cap and to display a wide view angle image. Further, since the light from the display element is incident on and reflected by the concave mirror at approximately a right angle due to the positional relationships described above, it is possible to form a high quality image throughout the wide view angle while suppressing aberration.

It is also possible to display a high resolution image and a full-page display of a document by using a high resolution display element for supporting the VGA class or higher resolution.

To correct aberration such as distortion or astigmatism of the virtual image formed by the concave mirror, it is also possible to correct the aberration by forming the concave mirror into an aspheric shape or a nonaxisymmetric shape instead of a spherical shape. When the distortion aberration is increased at a position away from the center of the image, it is also possible to provide a less distorted image to the wearer of the display device by intentionally distorting the image displayed on the small display element in the reverse direction to the distortion aberration caused by the concave mirror.

Such a display function may be prepared for either one eye or both eyes. For the purpose of providing a display for one eye, the display element and the concave mirror are disposed on one side of the eyes. For the purpose of providing a display for both eyes, one display element and one concave mirror sufficiently large for securing light flux for both eyes are disposed. Alternatively, two display elements respectively positioned above the eyes and two concave mirrors for guiding the light flux to the respective eyes are disposed. When using the two display elements and the concave mirrors, it is possible to couple the display elements or the concave mirrors integrally. When using the two display elements, it is also possible to display two images having parallax so that the wearer can observe a three-dimensional image, or to display a combination of different pieces of information on the respective display elements in a manner so as to display image information on the display element for one of the eyes while displaying character information on the display element for the other eye.

Figure 2:
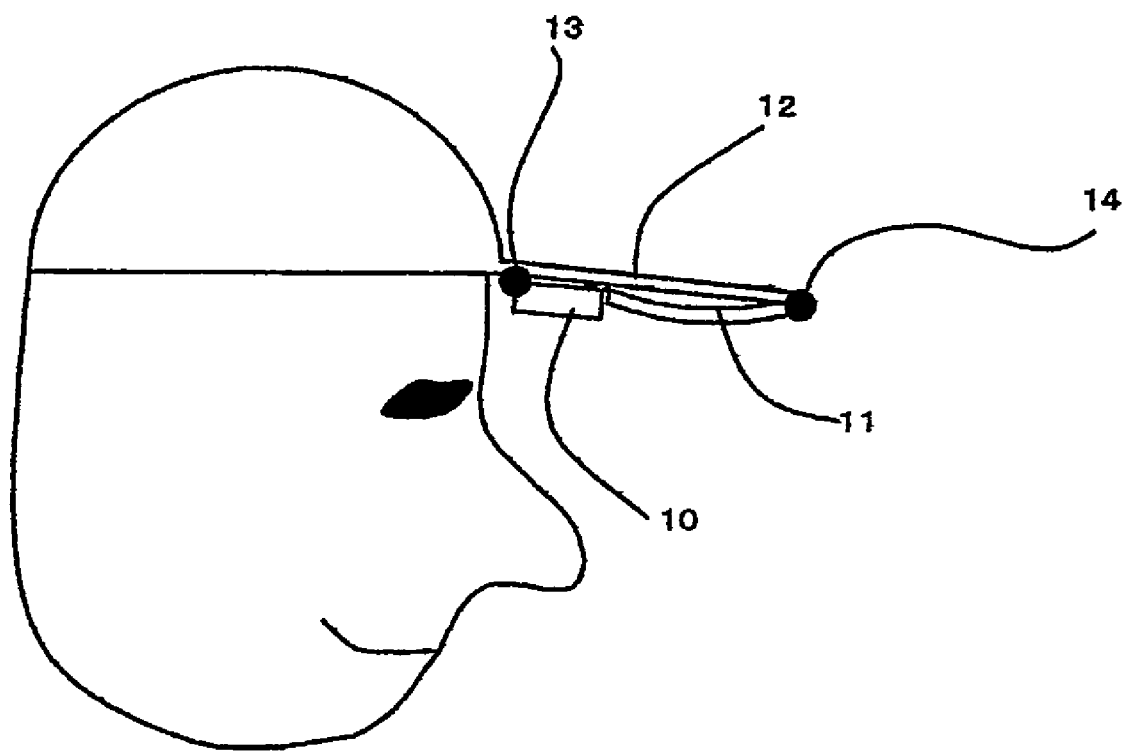
FIG. 2 is a view showing a small display element and a concave mirror folded into positions along side a visor.

FIG. 2 is a view showing a state when a small display element 10 and a concave mirror 11 are folded to positions along side a visor 12. The small display element 10 and the concave mirror 11 are fitted to the visor 12 of a cap by use of hinges 13 and 14, respectively. The small display element 10 and the concave mirror 11 are rendered rotatable around the hinges 13 and 14, respectively. The small display element 10 and the concave mirror 11 may be folded to the positions along side the visor 12 when the user wearing the cap does not wish to use the display function or when the user takes the cap off. In this way, the wearer can see the outside view, i.e., the view beyond the display more clearly or take off the cap easily.

Instead of folding the small display element 10 and the concave mirror 11 to the positions along side the visor 12, it is possible to adjust the visibility and the position of the displayed image to suit the preference of the wearer by slightly moving the small display element 10 and/or the concave mirror 11. The visibility and the position of the displayed image can be more freely adjusted by rendering the hinges 13 and 14 not only rotatable but also movable in parallel from front to back and from side to side.

Figure 3:
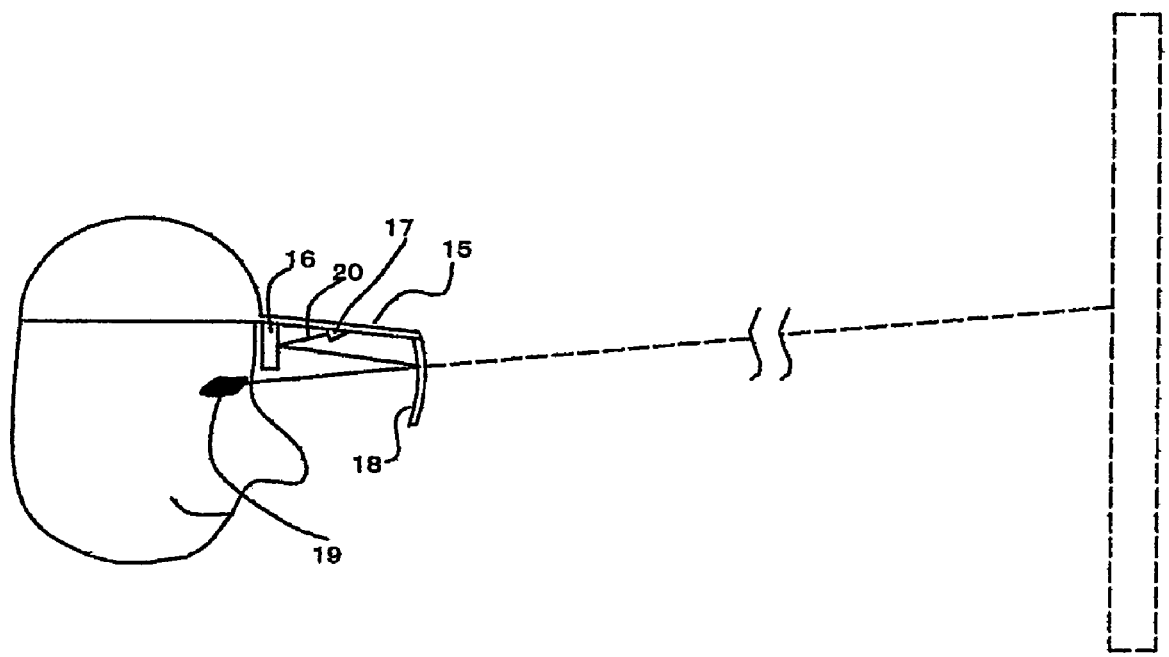
FIG. 3 is a view showing an example of the present invention using a reflective liquid crystal display as the small display element.

FIG. 3 is a view showing an example using a reflective liquid crystal display as the small display element. A light source 17 for illuminating the reflective liquid crystal display 16 is disposed below visor 15 of a cap in a position between the reflective liquid crystal display 16 and a concave mirror 18. The reference numeral 20 denotes a light path of the illumination light. The light from the light source 17 is provided with appropriate directivity so as to prevent direct entry of light into the eyes 19 of the wearer and to illuminate solely the reflective liquid crystal display 16. An image displayed on the reflective liquid crystal display 16 is illuminated by the illumination light source 17 and enlarged by the concave mirror 18, thereby allowing the wearer to observe an enlarged image. In this case, light intensity of the illumination light source may be rendered adjustable.

Figure 4:
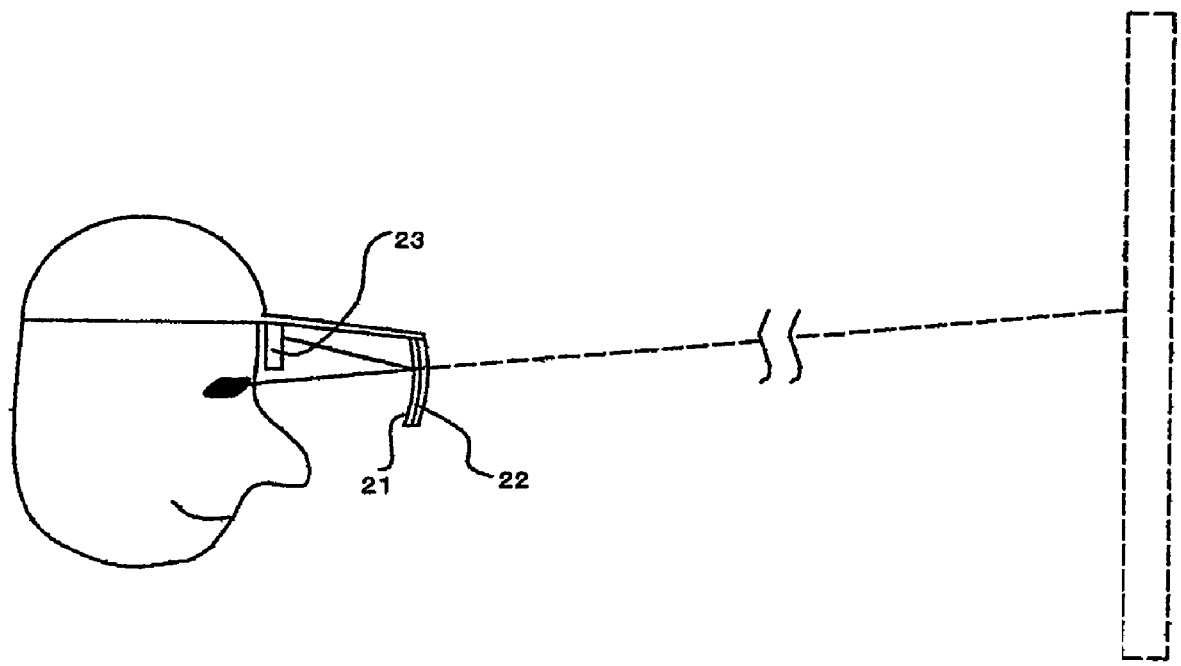
FIG. 4 is a view showing an example of the present invention incorporating a liquid crystal element for adjusting light transmittance into a concave mirror.

FIG. 4 is a view showing an example of incorporating a liquid crystal element 22 for adjusting light transmittance into a concave mirror 21. The liquid crystal element 22 can adjust light transmittance by applying a voltage to transparent electrodes (not shown) attached to both surfaces of the element. By using this action, it is possible to optimize contrast between the brightness of the image displayed on a small display element 23 and the brightness of a surrounding image observed through the concave mirror 21, thereby enabling the wearer to observe both pieces of visual information. In addition to the liquid crystal display element, other elements such as an electrochromic element, are applicable as elements for adjusting the light transmittance of the concave mirror 21, as long as such elements are configured to adjust the light transmittance.

The cap with a display device of the present invention may also include an image input device such as a camera, a microphone, and/or a speaker, so as to render the cap with a display device connectable to an image recording device or a voice recording device. In this way, the wearer of the cap can see and hear inputted images and voices by use of the image display function and the speaker of the cap, or record the images and voices with the connected recording devices. The wearer of the cap can also see and hear images and voices recorded in the recording devices by use of the image display function and the speaker of the cap. When the cap with a display device is used as an audio guide in a museum or a theater, the cap may include a receiver for receiving information transmitted from an external transmitter. Thereby, the cap with a display device is configured to output image information received from outside onto the display device.

Figure 5:
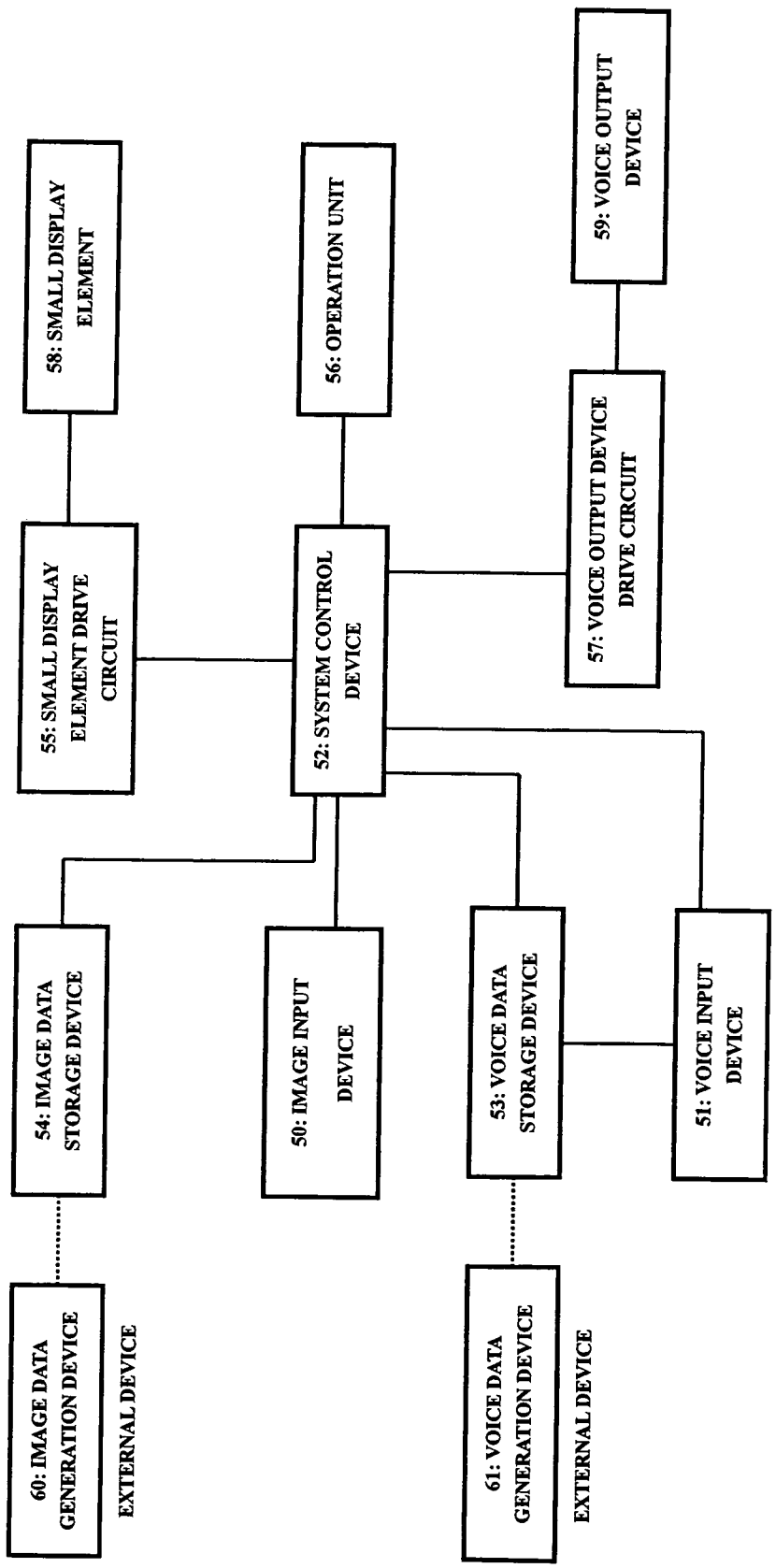
FIG. 5 is a block diagram showing a configuration of a control circuit for the present invention, including an image input device and a voice input device.

FIG. 5 is a block diagram showing the configuration of the control circuits for the cap with a display device which includes an image input device 50 and a voice input device 51. Data input from the image input device 50 and the voice input device 51 are transmitted to a system control device 52 and to respective data storage devices 53, 54, which are either integrated with the cap or connected to the cap through connection devices. An operation unit 56 is connected to the system control device 52 for allowing operations by the wearer of the cap, whereby the wearer can select the image input/output function or the voice input/output function.

In accordance with the selected operation of the operation unit 56, the system control device 52 outputs the input images or voices to the small display element 58 or a voice output device 59, records the images or voices in the image data storage device 54 or the voice data storage device 53, and outputs the recorded data. The data output from the system control device are transmitted to a small display element drive circuit 55 and/or a voice output device drive circuit 57. The drive circuits drive the small display element 58 and the voice output device 59, and thereby output the data. The image data storage device 54 and the voice data storage device 53 may also record image data and voice data from an external image data generation device 60 and an external voice data generation device 61 in advance. Such data may be output in accordance with an operation selected through the operation unit 56.

According to the present invention, it is possible to realize a display device having a small size, lightweight, wide field of view, high resolution, and high quality characteristics by disposing a small display element at an angle approximately perpendicular to an optical axis of a concave mirror, and by forming a virtual image provided with aberration correction throughout a wide field of view without using additional optical elements such as a prism block. The small display element is disposed below a visor of a cap. Accordingly, the small display element does not affect the appearance or increase the size of the cap.

The small display element is located in front of the forehead and above the eyes of a wearer. Accordingly, the small display element does not block the vision of the wearer or bother the wearer in relation to his or her field of view. Since it is possible to secure a sufficiently large solid angle defined by the eyes looking into the concave mirror, a displayed image does not partly vanish as a result of eye movement. Meanwhile, the concave mirror is rendered translucent in one aspect of the present invention. In this way, the wearer can have an outside view and a displayed image view in a superimposed manner without providing an additional optical element behind the concave mirror.

The small display element and the concave mirror can be folded to positions along the visor. Accordingly, it is possible to reduce the size of the cap for convenience in handling. In another aspect of the present invention, the positions of the small display element and the concave mirror are adjustable to fit the eyes of the wearer. Therefore, the wearer can see a displayed image comfortably while adjusting visibility and position of the displayed image precisely.

While the display device and concave mirror are shown attached to the visor of a cap, it should be understood that the important thing is that the display device and the mirror be in a proper relationship to the eyes of the user. Thus, any device for properly supporting these element, e.g., a helmet, is within the scope of the invention.

While the invention has been particularly shown and described with reference to a preferred embodiment thereof, it will be understood by those skilled in the art that various changes in form and details may be made therein without departing from the spirit and scope of the invention.

What is claimed is:

1. A cap comprising:
   a fitting part for covering at least a part of a head of a wearer;
   a visor fixed to the fitting part and protruding forward from a forehead of the wearer;
   a display element suspended from the bottom of the visor in a position in front of the forehead of the wearer, below the visor, and above the eyes of the wearer so as to allow a display surface of the display element to be directed ahead of the wearer; and
   a concave mirror suspended from the visor in a position below the visor and ahead of the display element from the wearer so as to allow a reflective surface of the concave mirror to be directed toward the display element and to the eyes of the wearer, the concave mirror forming an enlarged virtual image derived from an image displayed on the display element in a position observable by the wearer,
   wherein the display surface of the display element and the visor forms an angle of 90 degrees±10 degrees, and a plane perpendicular to the optical axis of the reflective surface of the concave mirror and the visor forms an angle of 90 degrees±10 degrees, a radius of curvature of the display surface as well as a distance between the display surface and the reflective surface determining the degree of enhancement of the virtual image and an apparent greater distance of the virtual image.

2. The cap according to claim 1,
wherein at least any one of the display element and the concave mirror is fitted movably to the visor and is foldable to a position along side the visor.

3. The cap according to claim 1,
wherein the concave mirror has optical transparency that may optimize contrast for enabling the wearer to observe the image displayed on the display element and a surrounding image simultaneously through the concave mirror.

4. The cap according to claim 3,
wherein at least any one of intensity of light transmitted through the concave mirror and brightness of the display element is rendered variable for enabling adjustment in any one of light intensity of the image displayed on the display element and light intensity of the surrounding image reaching the eyes of the wearer.

5. The cap according to claim 1,
wherein at least any one of the display element and the concave minor is fitted movably to the visor and is capable of adjusting a position of a virtual image observed by the wearer.

6. The cap according to claim 1,
wherein the display element is a reflective display element, and
the cap further comprises an illumination device for irradiating illumination light for illuminating the reflective display device, the illumination device being fitted below the visor in a position ahead of the reflective display element from the wearer.

7. The cap according to claim 6,
wherein at least any one of intensity of light transmitted through the concave mirror, intensity of light reflected by the reflective display element, and intensity of light from the illumination device is rendered variable for enabling adjustment in any one of light intensity of the image displayed on the display element and light intensity of the surrounding image reaching the eyes of the wearer.

8. The cap according to claim 1, further comprising:
at least any one of an image input device, a voice input device, and a voice output device,
wherein any one of the image input device and the voice input device is connectable to any one of an image recording device and a voice recording device configured to record any one of an image and a voice, and
the cap is configured to output at least any one of an image input from the image input device, an image recorded in the image recording device, a voice input from the voice input device, and a voice recorded in the voice recording device.

9. The cap according to claim 1 wherein light from the display element is incident on the concave mirror at an approximately right angle.

10. The cap according to claim 9,
wherein the display element is a high resolution display element for supporting a Video Graphics Array class or higher resolution.

11. The cap according to claim 9,
wherein the concave mirror incorporates a liquid crystal element for adjusting light transmittance.

12. The cap according to claim 1, wherein the display element and the concave mirror are located in positions so as to define an angle between an optical axis of the display element and an optical axis of the concave mirror to be approximately equal to a right angle.

13. The cap according to claim 12,
wherein the display element is a high resolution display element for supporting a Video Graphics Array class or higher resolution.

14. The cap according to claim 12,
wherein the concave mirror incorporates a liquid crystal element for adjusting light transmittance.

15. The cap according to claim 1,
wherein the display element is a high resolution display element for supporting a Video Graphics Array class or higher resolution.

16. The cap according to claim 1,
wherein the concave mirror incorporates a liquid crystal element for adjusting light transmittance.

17. The cap according to claim 1,
wherein both the display element and the concave mirror are fitted movably to the visor and are respectively foldable to a position along side the visor by use of hinges.

18. A cap comprising:
a fitting part for covering at least a part of a head of a wearer;
a visor fixed to the fitting part and protruding forward from a forehead of the wearer;
a display element suspended from the bottom of the visor in a position in front of the forehead of the wearer, below the visor, and above the eyes of the wearer so as to allow a display surface of the display element to be directed ahead of the wearer; and
a concave mirror suspended from the visor in a position below the visor and ahead of the display element from the wearer so as to allow a reflective surface of the concave mirror to be directed toward the display element and to the eyes of the wearer, the concave mirror forming an enlarged virtual image derived from an image displayed on the display element in a position observable by the wearer,
wherein both the display element and the concave mirror are fitted movably to the visor and are respectively foldable to a position along side the visor by use of hinges.

19. The cap according to claim 18,
wherein the concave mirror has optical transparency that may optimize contrast for enabling the wearer to observe the image displayed on the display element and a surrounding image simultaneously through the concave mirror.

20. The cap according to claim 19,
wherein at least any one of intensity of light transmitted through the concave mirror and brightness of the display element is rendered variable for enabling adjustment in any one of light intensity of the image displayed on the display element and light intensity of the surrounding image reaching the eyes of the wearer.

21. The cap according to claim 18,
wherein the display element is a reflective display element, and
the cap further comprises an illumination device for irradiating illumination light for illuminating the reflective display device, the illumination device being fitted below the visor in a position ahead of the reflective display element from the wearer.

22. The cap according to claim 21,
wherein at least any one of intensity of light transmitted through the concave mirror, intensity of light reflected by the reflective display element, and intensity of light from the illumination device is rendered variable for enabling adjustment in any one of light intensity of the image displayed on the display element and light intensity of the surrounding image reaching the eyes of the wearer.

23. The cap according to claim 18, further comprising:

at least any one of an image input device, a voice input device, and a voice output device, wherein any one of the image input device and the voice input device is connectable to any one of an image recording device and a voice recording device configured to record any one of an image and a voice, and the cap is configured to output at least any one of an image input from the image input device, an image recorded in the image recording device, a voice input from the voice input device, and a voice recorded in the voice recording device.

24. The cap according to claim 18, wherein light from the display element is incident on the concave mirror at an approximately right angle.

25. The cap according to claim 24, wherein the display element is a high resolution display element for supporting a Video Graphics Array class or higher resolution.

26. The cap according to claim 24, wherein the concave mirror incorporates a liquid crystal element for adjusting light transmittance.

27. The cap according to claim 18, wherein the display element and the concave mirror are located in positions so as to define an angle between an optical axis of the display element and an optical axis of the concave mirror to be approximately equal to a right angle.

28. The cap according to claim 27, wherein the display element is a high resolution display element for supporting a Video Graphics Array class or higher resolution.

29. The cap according to claim 27, wherein the concave mirror incorporates a liquid crystal element for adjusting light transmittance.

30. The cap according to claim 18, wherein the display element is a high resolution display element for supporting a Video Graphics Array class or higher resolution.

31. The cap according to claim 18, wherein the concave mirror incorporates a liquid crystal element for adjusting light transmittance.

32. The cap according to claim 18, wherein the display surface of the display element and the visor forms an angle of 90 degrees±10 degrees, and a plane perpendicular to the optical axis of the reflective surface of the concave mirror and the visor forms an angle of 90 degrees±10 degrees, a radius of curvature of the display surface as well as a distance between the display surface and the reflective surface determining the degree of enhancement of the virtual image and an apparent greater distance of the virtual image.

* * * * *